United States Patent [19]

Marsh et al.

[11] Patent Number: 5,137,648

[45] Date of Patent: * Aug. 11, 1992

[54] OVERBASED METAL SULPHONATE COMPOSITION

[75] Inventors: John F. Marsh, Abingdon, United Kingdom; Marc R. M. Vernet, Andresy, France; Graham W. Hamey, Radley, United Kingdom

[73] Assignee: Exxon Chemical Patents Inc., Linden, N.J.

[*] Notice: The portion of the term of this patent subsequent to May 12, 2009 has been disclaimed.

[21] Appl. No.: 729,970

[22] Filed: Jul. 15, 1991

Related U.S. Application Data

[62] Division of Ser. No. 255,886, Oct. 11, 1988, Pat. No. 5,112,506.

[30] Foreign Application Priority Data

Oct. 12, 1987 [GB] United Kingdom ............... 8723907

[51] Int. Cl.⁵ ........................................ C10M 159/24
[52] U.S. Cl. ................................. 252/33.4; 252/18; 252/25; 252/39; 252/33.3
[58] Field of Search ............... 252/18, 25, 33, 33.3, 252/33.4, 39

[56] References Cited

U.S. PATENT DOCUMENTS

| | | | |
|---|---|---|---|
| 3,772,198 | 11/1973 | Cease et al. | 252/33.4 |
| 3,857,790 | 12/1974 | Saunders et al. | 252/33.4 |
| 3,865,737 | 2/1975 | Kemp | 252/33.4 |
| 4,140,642 | 2/1979 | Kistler et al. | 252/33 |

FOREIGN PATENT DOCUMENTS 1103699 6/1981 Canada.
0001318 7/1978 European Pat. Off. .

Primary Examiner—Jacqueline Howard
Attorney, Agent, or Firm—J. B. Murray, Jr.

[57] ABSTRACT

A new overbased metal sulphonate composition comprises a mixture of (A) at least one long chain alkyl aryl sulphonate containing an average number of at least 40 carbon atoms in the alkyl residue and (B) at least one medium long chain alkyl aryl sulphonate containing an average number of 10 to 33 carbon atoms in the alkyl residue. The composition is useful as an additive to lubricant oil.

21 Claims, 2 Drawing Sheets

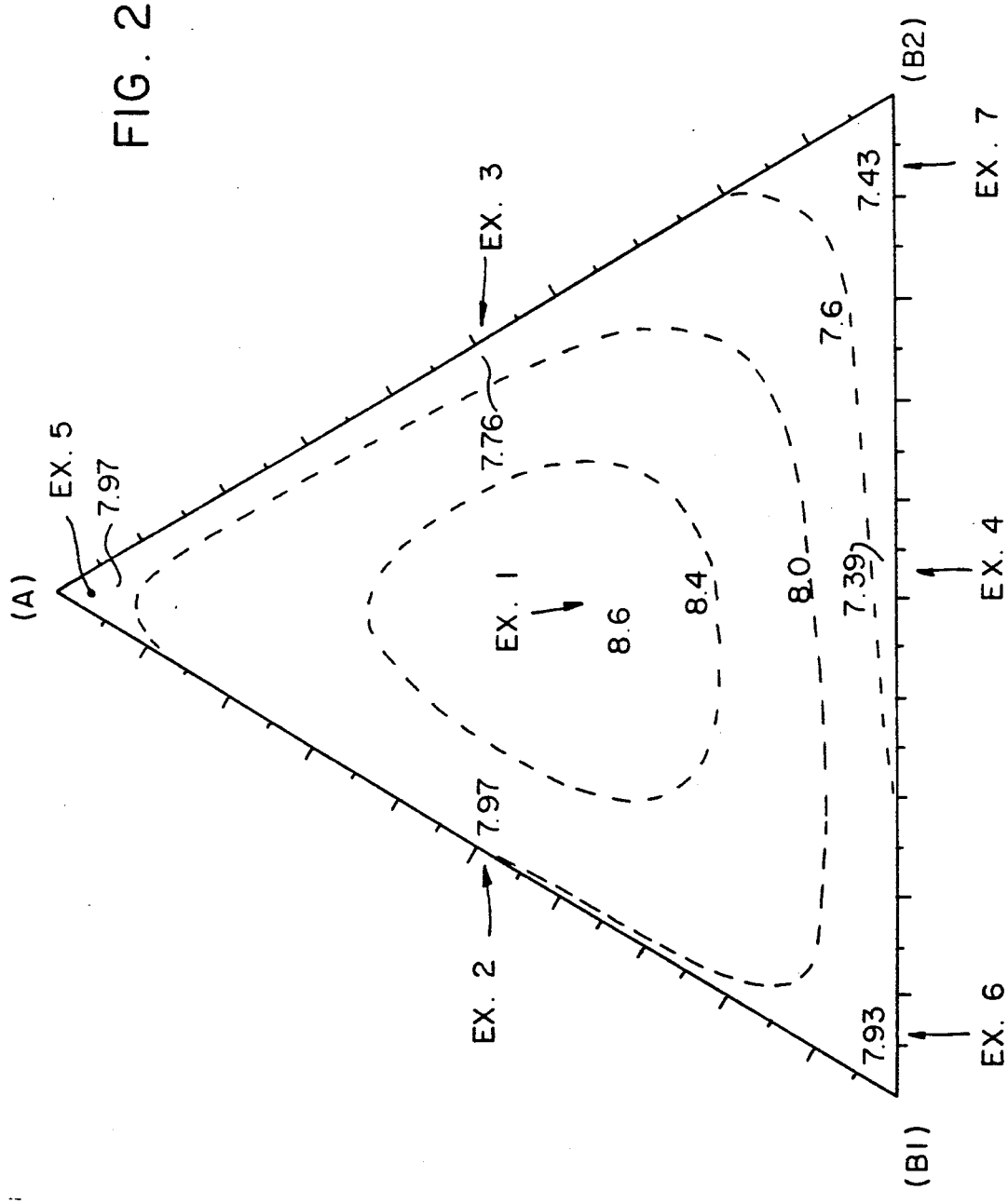

OVERBASED METAL SULPHONATE COMPOSITION

CROSS REFERENCE TO RELATED APPLICATION

This is a division of application Ser. No. 255,886, filed Oct. 11, 1988.

This invention concerns overbased metal alkyl aryl sulphonate compositions, their use as an additive to lubricant oil, lubricant oils containing the compositions, intermediates useful in the preparation of the compositions, as well as neutral alkyl aryl sulphonate salts.

Neutral and overbased metal alkyl aryl sulphonates are known for use in lubricants. The term "overbased" is used to describe metal salts in which the metal is present in stoichiometrically larger amounts than the sulphonic acid radical. Such overbased sulphonates are usually prepared by treating a reaction mixture comprising an alkyl aryl sulphonic acid, a reaction medium consisting essentially of an organic solvent for the alkyl aryl sulphonic acid, a stoichiometric excess of a metal base, and a promoter with carbon dioxide. Examples of alkyl aryl sulphonic acids which have been overbased include mono-eicosane substituted naphthalene sulphonic acid, dodecyl benzene sulphonic acid, didodecyl benzene sulphonic acid, dinonyl benzene sulphonic acid, dilauryl beta-naphthalene sulphonic acid, n-octadecyl benzene sulphonic acid, a branched chain $C_{24}$ alkyl benzene sulphonic acid and many others.

It is also known that neutral and overbased metal alkyl aryl sulphonates are useful as antirust and detergent additives in lubricants which act, for example, to improve engine cleanliness. During the combustion of fuel, acidic substances are formed which can cause corrosion of the engine and oxidation of the lubricant which in turn may lead to formation of deposits. The high degree of alkalinity of overbased sulphonates can be used to neutralise these acidic substances and to avoid or at least strongly reduce the detrimental effects of acidity. The development of engines, and particularly diesel engines, places more demanding requirements on lubricant performance, and there is therefore a desire for improved overbased metal sulphonate compositions.

In some applications a combination of overbased metal sulphonates and phenates is used as an additive (detergent/inhibitor) in lubricants. One of the problems with this combination is that sulphonates and phenates tend to interact and precipitate during storage.

Accordingly it is an object of this invention to provide new overbased metal sulphonate compositions. It is also an object of this invention to provide overbased metal sulphonate compositions with improved anti-corrosive activity for use in oleaginous compositions including lubricants, functional fluids and fuels. It is also an object of this invention to provide overbased metal sulphonate compositions which can be used to prevent or at least strongly reduce the formation of deposits in diesel engines. It is a further object of the invention to provide overbased metal sulphonate compositions which do not cause precipitation when used in combination with phenates as an additive in lubricants. It is also an object of this invention to provide intermediates for the preparation of these overbased sulphonate compositions, and neutral metal sulphonate salts.

In one aspect this invention provides an overbased metal sulphonate composition comprising:

(A) at least one metal alkyl aryl sulphonate containing 1 to 3 alkyl groups, one of which alkyl groups contains an average number of carbon atoms of at least 40 while any remaining alkyl groups contain less than 10 carbon atoms, and (B) at least one metal alkyl aryl sulphonate containing 1 to 3 alkyl groups, one of which alkyl groups contains an average number of carbon atoms of 10 to 33 while any remaining alkyl groups contain less than 10 carbon atoms.

Hereinafter the term "long chain alkyl group" is used for alkyl groups containing an average number of carbon atoms of at least 40. The term "medium long chain alkyl group" is used for alkyl groups containing an average number of carbon atoms of 10 to 33. The term "short chain alkyl group" is used for alkyl groups containing less than 10 carbon atoms. These alkyl groups need not necessarily be chains, but they can be linear, branched or cyclic alkyl groups. Usually they are saturated alkyl groups, but they can also contain some degree of unsaturation.

BRIEF DESCRIPTION OF THE DRAWINGS

FIG. 2 is a ternary graph showing the results of Examples 1 through 7.

Figure 1:
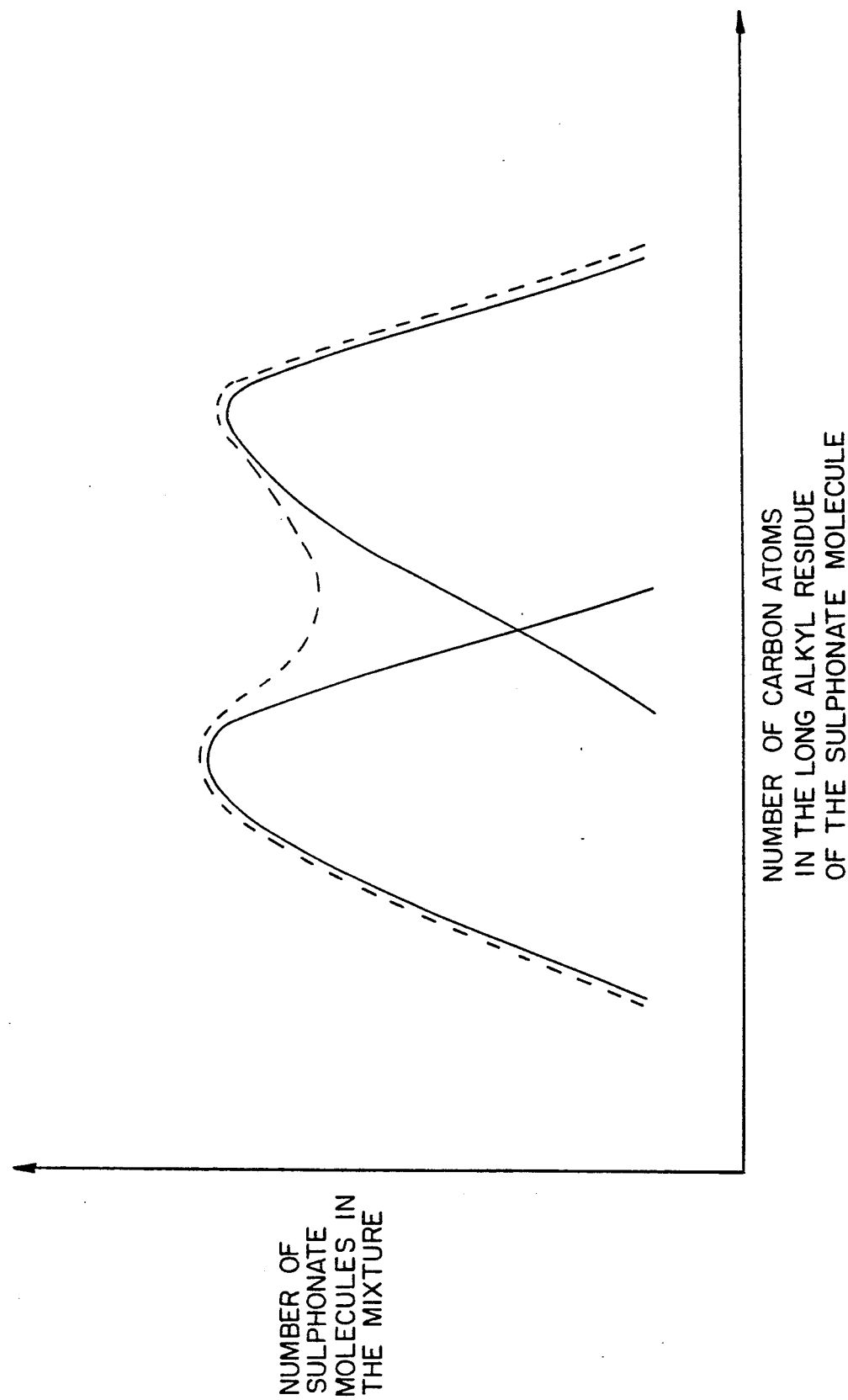
FIG. 1 is a graphic representation of the distribution of the alkyl residues of the alkyl aryl sulphonates.

The composition according to the present invention is characterised by a specific size distribution of the long and medium long chain alkyl residues of the alkyl aryl sulphonates, which distribution may be called "dumb-bell distribution".

FIG. 1 is a schematic representation of an example of this dumb-bell distribution. The size distribution of the long and medium long chain alkyl residues has at least 2 maxima, one at a size of 40 carbon atoms or larger and another at a size of 10 to 33 carbon atoms. The distribution has at least 1 minimum between these maxima.

In many cases, e.g. when the sulphonic acids employed in the mixture are identical except for the size of their long and medium long chain alkyl residues the dumb-bell distribution of the size of the alkyl residues is reflected by a similar distribution of the molecular weights. Mixtures of alkyl aryl sulphonates with a dumb-bell type molecular weight distribution are a preferred embodiment of this invention.

Surprisingly, the combination of long chain alkyl aryl sulphonates (A) and medium long chain alkyl aryl sulphonates (B) causes several beneficial effects. Compared to overbased medium long chain alkyl aryl sulphonates (B) alone the combinations (A)+(B) have an improved anti-corrosion effect, show better engine cleanliness performance and do not lead to precipitation during storage when used in conjunction with phenates.

The overbased metal sulphonates in the composition of the invention may be prepared by any suitable overbasing process and such processes are known in the art.

Such processes usually comprise heating a mixture comprising an oil-soluble sulphonate or alkaryl sulphonic acid, with an excess of alkali and/or alkaline earth metal compound above that required for complete neutralisation of any sulphonic acid present and forming a dispersed carbonate complex by reacting the excess metal with carbon dioxide to provide the desired overbasing. The use of a "promoter" in the neutralisation step to aid the incorporation of a large excess of metal is known and is preferred for the preparation of such compositions. Examples of compounds useful as the promoter include phenolic substances such as phenol, naphthol, alkyl phenols, thiophenol, sulphurised alkyl phenols, and condensation products of formaldehyde with a phenolic substance; alcohols such as methanol, 2-propanol, octanol, cellosolve, carbitol, ethylene glycol, stearyl alcohol and cyclohexanol; and amines such as aniline, phenylene diamine, phenothiazine, phenol beta-naphthylamine and dodecylamine. The sulphonic acids are typically obtained by the sulphonation of alkyl substituted aromatic hydrocarbons so that the sulphonic acid residue is bonded to the aromatic nucleus, for example those obtained by alkylating benzene, toluene, xylene, naphthalene, diphenyl and the halogen derivatives such as chlorobenzene, chlorotoluene and chloronaphthalene. Benzene, toluene and naphthalene are preferred, especially benzene. The alkylation may be carried out in the presence of a catalyst with alkylating agents—for example, haloparaffins, olefins obtained by dehydrogenation of paraffin and polyolefins are typically used.

The composition of the invention comprising (A) and (B) may either be prepared by overbasing a mixture of suitable alkyl aryl sulphonic acids, or by separate overbasing of individual alkyl aryl sulphonic acids followed by mixing the overbased products. In the former case the mixture of sulphonic acids may either be prepared by sulphonation of mixed alkyl aromatic compounds or by admixture of separately prepared alkyl aryl sulphonic acids.

The compositions of this invention have a total base number (TBN), as measured by ASTM D2896, which preferably is at least 20, more preferably in the range of from 30 to 500 and especially 250 to 350.

The metal present in the compositions usually is a group I metal or a group II metal, such as lithium, sodium, potassium, magnesium, calcium, strontium, or barium. It is also possible that combinations of these metals are employed. Alkaline earth metals and especially calcium and magnesium are preferred. The alkaline earth metal compounds which may be used in neutralising these alkaryl sulphonic acids to provide the sulphonates include the oxides and hydroxides, alkoxides, carbonates, carboxylate, sulphide, hydrosulphide, nitrate, borates and ethers of these metals. Examples are calcium oxide, calcium hydroxide, magnesium acetate and magnesium borate. As noted, the alkaline earth metal compound is used in excess of that required to complete neutralisation of the alkaryl sulphonic acids. Generally, the amount ranges from about 100 to 220% of the stoichiometric amount of metal required for complete neutralisation.

Component (A) must be present in the composition in an amount sufficient to cause the beneficial effects mentioned above. Usually component (A) makes up 10 to 99 wt % of the composition, the balance being (B).

It is preferred that the long chain alkyl group in component (A) is a branched alkyl group. Particularly suitable are branched long chain alkyl groups which contain an average number of carbon atoms of at least 50. Usually the branched long chain alkyl group is a mixture of alkyl groups selected from $C_{18}$ to $C_{200}$ alkyl groups. Such alkyl groups may be prepared, for example, by the polymerisation of propylene or of butylenes, specifically n-butene, using known techniques.

Two different types of medium long chain alkyl groups in component (B) are preferred. In component (B) the aryl group substituted with alkyl groups selected from $C_{15}$ to $C_{40}$ branched chain alkyl groups, the average number of carbon atoms being 15 to 33. Component (B2) is an alkyl aryl sulphonate containing $C_{10}$ to $C_{30}$ straight chain alkyl groups. Components (B1) and (B2) may be either pure compounds or mixtures of compounds. Preferably, component (B1) comprises a mixture of branched medium long chain alkyl groups while component (B2) is a substantially pure compound, i.e. all molecules of component (B2) contain the same medium long straight chain alkyl group. It is especially preferred that the medium long straight chain alkyl groups are selected from $C_{15}$ to $C_{25}$ straight chain alkyl groups. For some applications compositions comprising (A), (B1) and (B2) are particularly suitable.

Optionally components (A) and (B) contain one or two short chain alkyl groups in addition to the long chain or medium long chain alkyl groups. The preferred short chain alkyl groups are methyl and ethyl.

For different applications different proportions of components (A), (B1) and (B2) are preferred. A composition comprising 20 to 80 wt % of component (A), 10 to 60 wt % of component (B1), and 10 to 40 wt % of component (B2) is particularly suitable as a corrosion inhibiting additive to lubricant oil, i.e. for this application the use of a ternary composition is preferred.

If the overbased sulphonate composition of this invention shall be used in combination with phenates it may either be a binary mixture of components (A) and (B1) or (A) and (B2), respectively, or a ternary mixture of (A), (B1) and (B2). Up to 40 wt % of component (B1) and up to 80 wt % of component (B2) may be used. The proportion of component (A) is determined depending on the proportion of component (B2). Component (A) makes up $(60-x/2)$ to 99 wt % of the composition, x being the concentration of component (B2). Table 1 illustrates the relationship between the concentrations of components (A) and (B2).

TABLE 1

| wt % B2 | wt % A |
|---|---|
| 0 | 60–99 |
| 20 | 50–99 |
| 40 | 40–99 |
| 60 | 30–99 |
| 80 | 20–99 |

The same proportion is preferred if the composition shall be used as an additive to diesel engine lubricant oil to improve combustion chamber and piston cleanliness. For this application a mixture of mono-alkyl benzene sulphonates is particularly suitable.

The invention also extends to neutral salts of the alkyl aryl sulphonic acids—that is, to salts which have not been subjected to overbasing, although they may have some inherent basicity.

The compositions of the invention may find applications in a wide range of oleaginous compositions such as lubricants for engines, automatic transmission fluids, tractor oils, fuels and coatings where the detergent and/or inhibition performance of the overbased sulphonates is beneficial.

These lubricating oil formulations conventionally contain several different types of additives that will supply the characteristics that are required in the formulations. Among these types of additives are included ashless dispersants, such as (i) oil soluble salts, amides, imides, oxazolines and esters, or mixtures thereof, of long chain hydrocarbon substituted mono and dicarboxylic acids or their anhydrides; (ii) long chain aliphatic hydrocarbons having a polyamine attached directly thereto; and (iii) Mannich condensation products formed by condensing about a molar proportion of long chain hydrocarbon substituted phenol with about 1 to 2.5 moles of formaldehyde and about 0.5 to 2 moles of polyalkylene polyamine; viscosity index improvers; antioxidants; corrosion inhibitors; additional detergents; pour point depressants; antiwear agents such as metal salts of dihydrocarbyl dithiophosphoric acid.

The base oil used in lubricating oil compositions may be a natural or synthetic oil of the appropriate viscosity. Natural oils include animal oils and vegetable oils (e.g., castor, lard oil) liquid petroleum oils and hydrorefined, solvent-treated or acid-treated mineral lubricating oils of the paraffinic, naphthenic and mixed paraffinic-naphthenic types. Oils of lubricating viscosity derived from coal or shale are also useful base oils. Synthetic oils include alkylene oxide polymers and interpolymers and derivatives thereof where the terminal hydroxyl groups have been modified by esterification or etherification, esters of dicarboxylic acids, and silicon-based oils such as the polyalkylpolyaryl-, polyalkoxy-, or polyaryloxysiloxane oils and silicate oils.

The novel compositions of the present invention can be used with V.I. improvers to form multi-grade lubricating oils. Viscosity modifiers impart high and low temperature operability to the lubricating oil and permit it to remain relatively viscous at elevated temperatures and also exhibit acceptable viscosity or fluidity at low temperatures. Viscosity modifiers are generally high molecular weight hydrocarbon polymers including polyesters. The preferred hydrocarbon polymers are ethylene copolymers containing from 15 to 90 wt % ethylene, preferably 30 to 80 wt % of ethylene and 10 to 85 wt %, preferably 20 to 70 wt % of one or more $C_3$ to $C_{28}$, preferably $C_3$ to $C_{18}$, more preferably $C_3$ to $C_8$, alpha-olefins. While not essential, such copolymers preferably have a degree of crystallinity of less than 25 wt %, as determined by X-ray and differential scanning calorimetry. Copolymers of ethylene and propylene are most preferred. Terpolymers, tetrapolymers, etc., of ethylene, said $C_3$–$C_{28}$ alpha-olefin, and a non-conjugated diolefin or mixtures of such diolefins may also be used. The viscosity modifiers may also be derivatised to include other properties or functions, such as the addition of dispersancy properties. These oil soluble viscosity modifying polymers will generally have number average molecular weights of from $10^3$ to $10^6$, preferably $10^4$ to $10^6$, e.g., 20,000 to 250,000, as determined by gel permeation chromatography or osmometry.

Antioxidants useful in this invention include sulphurised alkyl phenols such as described in the following U.S. Pat. Nos. (which are incorporated by reference herein): 2,139,766; 2,198,828; 2,230,542; 2,836,565; 3,285,854; 3,538,166; 3,844,956; and 3,951,830 and oil soluble copper compounds. Any suitable oil soluble copper compound may be used. By oil soluble we mean the compound is oil soluble under normal blending conditions in the oil or additive package. The copper compound may be in the cuprous or cupric form. The copper may, for example, be in the form of the copper dihydrocarbyl thio- or dithio-phosphates, copper salts of synthetic or natural carboxylic acids, and copper dithiocarbamates. Examples of useful copper compounds are copper ($Cu^I$ and/or $Cu^{II}$) salts of alkenyl succinic acids or anhydrides. The salts themselves may be basic, neutral or acidic.

The copper antioxidants used in this invention are inexpensive and are effective at low concentrations and therefore do not add substantially to the cost of the product. The results obtained are frequently better than those obtained with previously used antioxidants, which are expensive and used in higher concentrations. In the amounts employed, the copper compounds do not interfere with the performance of other components of the lubricating composition.

While any effective amount of the copper antioxidant can be incorporated into the lubricating oil composition, it is contemplated that such effective amounts be sufficient to provide said lube oil composition with an amount of the copper antioxidant of from about 5 to 500 (more preferably 10 to 200, still more preferably 10 to 180, and most preferably 20 to 130 (e.g., 90 to 120)) part per million of added copper based on the weight of the lubricating oil composition. Of course, the preferred amount may depend amongst other factors on the quality of the basestock lubricating oil.

Corrosion inhibitors, also known as anti-corrosive agents, reduce the degradation of the non-ferrous metallic parts contacted by the lubricating oil composition. Illustrative of corrosion inhibitors are phosphosulfurized hydrocarbons and their derivatives.

Friction modifiers serve to impart the proper friction characteristics of lubricating oil compositions such as automatic transmission fluids. Examples of suitable friction modifiers are fatty acid esters and amides; molybdenum complexes of polyisobutenyl succinic anhydride-amino alkanols; glycerol esters of dimerized fatty acids; alkane phosphonic acid salts; reaction products of a phosphonate with an oleamide; S-carboxy-alkylene hydrocarbyl succinimide, S-carboxy-alkylene hydrocarbyl succinamic acid and mixtures thereof; N-(hydroxy-alkyl) alkenyl-succinamic acids or succinimides; reaction products of di- (lower alkyl) phosphites and epoxides; and the alkylene oxide adduct of phosphosulfurized N-(hydroxyalkyl) alkenyl succinimides.

Pour point depressants lower the temperature at which the fluid will flow or can be poured. Such depressants are well known. Typical of those additives which usefully optimise the low temperature fluidity of the fluid are $C_8$–$C_{18}$ dialkylfumarate vinyl acetate copolymers, polymethacrylates, and wax naphthalene.

Foam control can be provided by an antifoamant of the polysiloxane type, e.g. silicone oil and polydimethyl siloxane.

Organic, oil-soluble compounds useful as rust inhibitors in this invention comprise nonionic surfactants such as polyoxyalkylene polyols and esters thereof, and anionic surfactants such as salts of alkyl sulfonic acids. Such anti-rust compounds are known and can be made by conventional means.

The lubricating composition of the present invention may also include copper lead bearing corrosion inhibitors. Typically such compounds are the thiadiazole polysulphides containing from 5 to 50 carbon atoms, their derivatives and polymers thereof. Preferred materials are the derivatives of 1,3,4-thiadiazoles such as the compounds commercially available as Amoco 150 or Amoco 158.

Some of these numerous additives can provide a multiplicity of effects, e.g., a dispersant-oxidation inhibitor. This approach is well known and need not be further elaborated herein.

Compositions when containing these conventional additives are typically blended into the base oil in amounts effective to provide their normal attendant function. Representative effective amounts of such additives (as the respective active ingredients) in the fully formulated oil are illustrated as follows:

| Compositions | Wt % A.I. (Preferred) | Wt % A.I. (Broad) |
|---|---|---|
| Ashless Dispersant | 4–7 | 1–10 |
| Viscosity Modifiers | 0–4 | 0–12 |
| Detergents | 0.01–0.4 | 0.01–0.6 |
| Corrosion Inhibitors | 0.01–0.5 | 0–1.5 |
| Oxidation Inhibitors | 0–5 | 0–10 |
| Pour Point Depressants | 0.01–0.5 | 0.01–1.0 |
| Anti-foaming Agents | 0.001–0.01 | 0.001–0.1 |
| Antiwear Agents | 0.001–2 | 0–5 |
| Friction Modifiers | 0.01–1.5 | 0–5 |
| Lubricating Base Oil | Balance | Balance |

When other additives are employed, it may be desirable, although not necessary, to prepare additive concentrates comprising concentrated solutions or dispersions of the novel detergent inhibitor/antiwear agent mixtures of this invention (in concentrate amounts hereinabove described), together with one or more of said other additives (said concentrate when constituting an additive mixture being referred to herein as an additive-package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the additives in proper amounts to provide the desired concentration in the final formulation when the additive-package is combined with a predetermined amount of base lubricant. Thus, the detergent inhibitor/antiwear agent mixtures of the present invention can be added to small amounts of base oil or other compatible solvents along with other desirable additives to form additive-packages containing active ingredients in collective amounts of typically from 2.5 to 90%, and preferably from 15 to 75%, and most preferably from 25 to 60% by weight additives in the appropriate proportions with the remainder being base oil.

The present invention also provides intermediates useful in the preparation of the above overbased sulphonate compositions. The first intermediate is a mixture of long chain and medium long chain alkyl aromatic hydrocarbons. This mixture can be obtained by alkylation of the aromatic hydrocarbon, e.g. benzene, with an appropriate mixture of alkylating agents. The second intermediate is a mixture of long chain and medium long chain alkyl aryl sulphonic acids which can be obtained by sulphonation of the mixture of alkyl aromatic hydrocarbons. The sulphonic acid mixture can be converted into the overbased sulphonate composition by the process mentioned in the introduction.

The invention is further illustrated by the following examples.

EXAMPLE 1

An overbased calcium sulphonate composition was prepared starting from the following three sulphonic acids in a weight ratio of 1:1:1, i.e. each acid was employed in an amount of 33.3 wt % of the mixture.

(A) A branched long chain mono-alkyl benzene sulphonic acid containing a mixture of alkyl residues with an average number of carbon atoms of 50.

(B1) A branched medium long chain mono-alkyl benzene sulphonic acid containing a mixture of alkyl residues with an average number of carbon atoms of 24.

(B2) A substantially pure straight chain $C_{18}$ mono-alkyl benzene sulphonic acid.

The overbased calcium sulphonate solution had the following compositions:

| | wt % |
|---|---|
| Calcium Sulphonate | 28 |
| Calcium Carbonate | 23 |
| Calcium Hydroxide | 3 |
| Water | 0.2 |
| Oil | 45 |
| Impurities | 0.8 | and had a TBN of 300.

This overbased calcium sulphonate solution was incorporated into the following lubricating oil formulation.

| | wt % |
|---|---|
| Overbased Calcium Sulphonate Solution | 1.4 |
| Dispersant (a 55% oil solution of a borated polyisobutenyl succinimide dispersant which solution has a nitrogen content of 1.46 wt %) | 4.5 |
| ZDDP anti-wear (a 74% oil solution of a zinc dialkyl dithiophosphate prepared from primary alcohols, the solution containing 9.0 wt % zinc) | 1.3 |
| Oil (150 Neutral) | 15.0 |
| Oil (600 Neutral) | 77.8 |

The low temperature rusting and corrosion characteristics of this engine oil were evaluated according to the procedure of ASTM STP 315 using a 1977 Oldsmobile V8 engine. This engine has a displacement of 350 cubic inches and a compression ratio of 8.5:1. The test is designed to deliberately condense out the acidic blow-by gasses and introduce them to the engine parts. This is achieved by cooling the rocker box covers.

The test was run under these conditions for 30 hours and followed by a 2 hour period at maximum load, higher speed, and higher temperatures to bake the rust onto the component surfaces.

The test was run on GMR995 leaded gasoline and comprised three cycles as follows:

| | | Phase 1 | Phase 2 | Phase 3 |
|---|---|---|---|---|
| Duration | (hrs) | 28 | 2 | 2 |
| Speed | (rpm) | 1400 | 1500 | 3600 |
| Load | (bhp) | 25 | 25 | 100 |
| Oil Inlet Temp. | (°F.) | 120 | 120 | 260 |
| Coolant Outlet Temp. | (°F.) | 110 | 120 | 200 |
| Rocker Box Cover Temp. | (°F.) | 60 | 60 | |

After the test the individual engine parts are separately rated for rust on a scale of 1 to 10, 1 standing for "badly damaged" and 10 standing for "perfect condition". The average rust rating is derived from the combined ratings of components as follows.

| Component (s) | Total No. | Contribution to Overall Rating (%) |
|---|---|---|
| Oil R/V | 1 | 20 |
| Balls | 16 | 1.25 |
| Lifters | 16 | 1.25 |
| Plungers | 16 | 1.25 |
| Pushrods | 16 | 1.25 |

The average rust rating for the oil of Example 1 obtained by two separate tests in the way described was 8.6 and 8.46, respectively.

EXAMPLES 2 AND 3

EXAMPLES 4 TO 7 (COMPARATIVE EXAMPLES)

Example 1 was repeated with the difference that instead of the 1:1:1 ternary mixture of sulphonic acids (A), (B1) and (B2) the individual components or binary mixtures of two of them were employed as the starting material in the preparation of the overbased solution. The average rust ratings obtained are shown in Table 2.

TABLE 2

| Example | Sulphonic Acid | Average Rust Rating |
|---|---|---|
| 2 | 50 wt % (A) + 50 wt % (B1) | 7.97 |
| 3 | 50 wt % (A) + 50 wt % (B2) | 7.76 |
| 4 | 50 wt % (B1) + 50 wt % (B2) | 7.39 |
| 4 | 100 wt % (A) | 7.97 |
| 6 | 100 wt % (B1) | 7.93 |
| 7 | 100 wt % (B2) | 7.43 |

The results of Examples 1 to 7 are summarised in FIG. 2. It is obvious that the ternary mixture of Example 1 has a better anti-corrosive effect than any of the binary mixtures or pure compounds.

EXAMPLE 8

An overbased calcium sulphonate composition was prepared starting from a mixture of 50 wt % of the branched long chain mono-alkyl benzene sulphonic acid (A) and 50 wt % of the branched medium long chain mono-alkyl sulphonic acid (B2) described in Example 1. This mixture of sulphonic acids was converted into an overbased calcium sulphonate solution of the composition given in Example 1.

42.9 wt % of this overbased calcium sulphonate solution, 42.9 wt % of a solution of an overbased calcium salt of an alkyl substituted thiobisphenol having a TBN of 250 containing a 9.5% Ca. (phenate I) and 14.2 wt % of oil (150 neutral) were blended at 60° C. for one hour to form an additive concentrate. 28.12 wt % of the additive concentrate were blended with 71.88 wt % of oil (600 neutral) for one hour at 60° C. to obtain an oil blend.

Two samples of the oil blend were stored for 8 weeks in 100 ml centrifuge tubes, one at 20° C. and the other one at 60° C. Then for each sample the volume of sediment formed during storage was determined.

Example 8 was repeated twice. The following results were obtained:

| 20° C.: | 0.01 volume % |
|---|---|
|  | 0.01 volume % |
|  | trace |
| 60° C.: | 0.02 volume % |
|  | 0.03 volume % |
|  | 0.01 volume % |

Example 8 was repeated another three times using a different solution of an overbased calcium salt of an alkyl substituted thiobisphenol and having a TBN of 250 containing 9.25% Ca (phenate II). The following results were obtained:

| 20° C.: | 0.02 volume % |
|---|---|
|  | 0.01 volume % |
|  | trace |
| 60° C.: | 0.04 volume % |
|  | 0.02 volume % |
|  | 0.01 volume % |

EXAMPLES 9 TO 14

EXAMPLE 15 (COMPARATIVE EXAMPLE)

Example 8 was repeated using different binary mixtures of the sulphonic acids (A), (B1) and (B2) of Example 1 as starting materials.

The results are summarised in Table 3. It is obvious that the blends according to this invention form far less sediment during storage than the blend of comparative Example 15.

TABLE 3

| | | Stability of Sulphonate/Phenate Formulations | | | | | | |
|---|---|---|---|---|---|---|---|---|
| | | | | | Vol. % Sediment after 8 weeks | | | |
| | | Sulphonic Acid | | | Phenate I | | Phenate II | |
| Example | Run | A | (B1) | (B2) | 20° C. | 60° C. | 20° C. | 60° C. |
| 15 | 1 |  | 75 | 25 | 9 | 6 | 4 | 5 |
| 14 | 1 | 87.5 | 12.5 |  | 0.01 | 0.02 | 0.02 | 0.02 |
|  | 2 |  |  |  | 0.35 | 0.01 | 0.20 | 0.05 |
| 13 | 1 | 83 | 17 |  | 0.01 | 0.03 | 0.01 | 0.04 |
|  |  |  |  |  | 0.04 | 0.01 | 0.01 | 0.02 |
| 12 | 1 | 75 | 25 |  | 0.02 | 0.01 | 0.01 | 0.01 |
|  | 2 |  |  |  | 0.02 | 0.01 | 0.02 | 0.01 |
|  | 3 |  |  |  | 0.02 | 0.02 | 0.02 | 0.03 |
| 11 | 1 | 87.5 |  | 12.5 | 0.05 | 0.01 | 0.01 | 0.02 |
| 10 | 1 | 83 |  | 17 | 0.06 | 0.02 | 0.02 | 0.03 |
| 9 | 1 | 75 |  | 25 | 0.20 | 0.02 | 0.01 | 0.03 |
|  | 2 |  |  |  | 0.01 | 0.03 | 0.02 | 0.01 |
|  | 3 |  |  |  | Trace | 0.01 | Trace | 0.03 |
| 8 | 1 | 50 |  | 50 | 0.01 | 0.02 | 0.02 | 0.04 |
|  | 2 |  |  |  | 0.01 | 0.03 | 0.01 | 0.02 |

TABLE 3-continued

Stability of Sulphonate/Phenate Formulations

| | | Sulphonic Acid | | | Vol. % Sediment after 8 weeks | | | |
| | | | | | Phenate I | | Phenate II | |
| Example | Run | A | (B1) | (B2) | 20° C. | 60° C. | 20° C. | 60° C. |
|---|---|---|---|---|---|---|---|---|
| | 3 | | | | Trace | 0.01 | Trace | 0.01 |

EXAMPLES 16 AND 17

Examples 8 and 12 were repeated with the difference that instead of the mono-alkyl benzene sulphonic acids the corresponding 2-methyl-5-alkyl benzene sulphonic acid and 2-alkyl-5-methyl isomer (containing also some 3methyl-4-alkyl sulphonic acid and 3alkyl-4methyl isomer) were employed as the starting materials in the preparation of the overbased sulphonate composition. After 8 weeks' storage of the oil blends at 20° C. and 60° C. the amount of sediment formed was in all cases below 0.03 volume %.

EXAMPLE 18

The binary overbased calcium sulphonate solution of Example 8 having a total base number of 300 was incorporated into the following oil formulation:

| | wt % |
|---|---|
| Overbased Calcium Sulphonate Solution | 5.7 |
| Dispersant | 1.5 |
| (a 44% oil solution of a polyiso- | |
| butenyl succinimide dispersant, | |
| which solution has a nitrogen | |
| content of 1.12 wt %) | |
| Oil (150 Neutral) | 15.0 |
| Oil (600 Neutral) | 77.8 |

The effect of this oil formulation on ring sticking, wear and accumulation of deposits under high speed, supercharged conditions, was determined according to the standard procedures of US FED.STD 791-341 and ASTM 509A using a single-cylinder caterpillar diesel engine having the following specification:

| No. of Cylinders: | 1 |
|---|---|
| Bore: | 130.2 mm |
| Stroke: | 165.1 mm |
| Engine arrangement: | 1Y73 supercharged |
| Piston-type | 1Y510 |

The test was run on a fuel containing 0.4% sulphur.

The test was not run for the total duration of 480 hours according to the standard procedures but it was terminated after 120 hours. The test operating conditions were as follows:

| Speed, RPM | 1800 ± 10 | Oil inlet temp. °F. | 205 ± 5 |
|---|---|---|---|
| Load, BTU/min | 5850 ± 50 | Water outlet temp. °F. | 190 ± 5 |
| Exhaust temp. °F. | 1100 ± 50 | Air inlet temp. °F. | 255 ± 5 |
| Comp. ratio | 16.4.1 ± 0.5 | Air inlet pressure (absolute) ins Hg | 53 ± 0.3 |
| | | Air inlet humidity (grains/lb dry-air) | 125 ± 5 |

The test results are reported as weighted total demerit (WTD) and top groove fill (TGF).

The WTD weights the deposit both for the type of deposit and its position. Thus, carbonaceous deposits attract a higher demerit rating than lacquer deposits, and deposits down the piston are multiplied by a higher factor. This weighting for deposit type is useful, as heavy carbonaceous deposits obviously imply more severe deposit forming conditions than formation of a thin film or lacquer. The multiplication factors used for assessing the WTD are shown in Table 4.

TABLE 4

Multiplication Factors used for Assessing Weighted Total Demerit (WTD)

| Deposit Type | Deposit Factor | Deposit Location | Location Factor |
|---|---|---|---|
| Heavy Carbon | 1.0 | 1st Groove | 1 |
| Medium Carbon | 0.5 | 1st Land | 3.5 |
| Light Carbon | 0.25 | 2nd Groove | 10 |
| Black Lacquer | 0.1 | 2nd Land | 20 |
| Dark Brown Lacquer | 0.075 | 3rd Groove | 35 |
| Amber Lacquer | 0.05 | 3rd Land | 35 |
| Light Amber Lacquer | 0.025 | 4th Groove | 70 |
| Very Light Amber Lacquer | 0.01 | | |

The TGF is calculated an estimate of the percentage of the top groove behind the piston ring which is filled by carbon deposits.

The results obtained for the engine oil formulation o Example 18 were a WTD value of 30 and a TGF value of 38.

EXAMPLE 19 (COMPARATIVE EXAMPLE)

Example 18 was repeated twice with the difference that the sulphonic acid mixture of comparative Example 15 was used as the starting material in the preparation of the overbased sulphonate composition, said mixture consisting of 75 wt % of the branched medium long chain mono-alkyl benzene sulphonic acid (B1) and 25 wt % of the straight chain $C_{18}$ mono-alkyl benzene sulphonic acid (B2).

The results obtained for the engine oil formulation of Example 19 were WTD values of 230/223 and TGF values of 77/76.

Mixtures of branched and straight medium long chain alkyl benzene sulphonates are at present widely used as engine oil additives. A comparison of Examples 18 and 19 shows that a sulphonate composition according to the present invention is superior to the additive currently in use with respect to engine cleanliness performance.

We claim:

1. An overbased metal sulphonate composition comprising a liquid vehicle and
(A) at least one metal alkyl aryl sulphonate containing 1 to 3 alkyl groups, one of which alkyl groups contains an average number of carbon atoms of at least 40 while any remaining alkyl groups contain less than 10 carbon atoms, and
(B) at least one metal alkyl aryl sulphonate containing 1 to 3 alkyl groups, one of which alkyl groups contains an average number of carbon atoms of 10 to 33 while any remaining alkyl groups contain less than 10 carbon atoms.

2. A composition according to claim 1 having a total base number of 30 to 500.

3. A composition according to claim 2 having a total base number of 250 to 350.

4. A composition according to claim 1, wherein the alkyl aryl sulphonates are alkyl benzene sulphonates.

5. A composition according to claim 1, wherein the metal is selected from group I metals and group II metals.

6. A composition according to claim 5, wherein the metal is magnesium.

7. A composition according to claim 1 containing
10 to 99 weight percent of component (A) and
90 to 1 weight percent of component (B).

8. A composition according to claim 1, wherein the alkyl group in component (A) which contains an average number of carbon atoms of at least 40 is a branched chain alkyl group.

9. A composition according to claim 8 wherein said branched chain alkyl group contains an average number of carbon atoms of at least 50.

10. A composition according to claim 2, wherein component (B) is (B1) an alkyl aryl sulphonate containing $C_{15}$ to $C_{40}$ branched chain alkyl groups, the average number of carbon atoms in the branched chain alkyl groups being 15 to 33, and (B2) an alkyl aryl sulphonate containing $C_{10}$ to $C_{30}$ straight chain alkyl groups.

11. A composition according to claim 10 comprising a combination of
(A) a mixture of alkyl benzene sulphonates containing 1 to 3 alkyl groups, one of which alkyl groups is a branched long chain alkyl group containing 18 to 200 carbon atoms while any remaining alkyl groups contain less than 10 carbon atoms, the average number of carbon atoms in the branched long chain alkyl group being at least 40,
(B1) a mixture of alkyl benzene sulphonates containing 1 to 3 alkyl groups, one of which alkyl groups is a branched medium long chain alkyl group containing 10 to 40 carbon atoms while any remaining alkyl groups contain less than 10 carbon atoms, the average number of carbon atoms in the branched medium long chain alkyl group being 15 to 33, and/or
(B2) a substantially pure alkyl benzene sulphonate containing 1 to 3 alkyl groups, one of which alkyl groups is a $C_{10}$ to $C_{30}$ straight chain alkyl group while any remaining alkyl groups contain less than 10 carbon atoms.

12. A composition according to claim 10 wherein the straight chain alkyl group of component (B2) is selected from $C_{15}$ to $C_{25}$ alkyl groups.

13. A composition according to claim 10, comprising a mixture of
20 to 80 weight percent of component (A),
10 to 60 weight percent of component (B1), and
10 to 40 weight percent of component (B2).

14. A composition according to claim 10, comprising
0 to 40 weight percent of component (B1),
0 to 80 weight percent of component (B2), the concentration of component (B2) defining a value x of 0 to 80, and
(60−x/2) to 99 weight percent of component (A).

15. A composition according to claim 4, wherein the alkyl benzene sulphonates are mono-alkyl benzene sulphonates.

16. An alkylated aromatic hydrocarbon composition useful as an intermediate in the preparation of overbased metal sulphonate compositions comprising a mixture of
(A) at least one alkyl aromatic hydrocarbon containing 1 to 3 alkyl groups, one of which alkyl groups contains an average number of carbon atoms of at least 40 while any remaining alkyl groups contain less than 10 carbon atoms and
(B) at least one alkyl aromatic hydrocarbon containing 1 to 3 alkyl groups, one of which alkyl groups contains an average number of carbon atoms of 10 to 33 while any remaining alkyl groups contain less than 10 carbon atoms.

17. A sulphonic acid composition useful as an intermediate in the preparation of overbased metal sulphonate compositions comprising
(A) at least one alkyl aryl sulphonic acid containing 1 to 3 alkyl groups, one of which alkyl groups contains an average number of carbon atoms of at least 40 while any remaining alkyl groups contain less than 10 carbon atoms and
(B) at least one alkyl aryl sulphonic acid containing 1 to 3 alkyl groups, one of which alkyl groups contains an average number of carbon atoms of 10 to 33 while any remaining alkyl groups contain less than 10 carbon atoms.

18. A neutral metal salt of a sulphonic acid composition wherein the sulphonic acid comprises
(A) at least one alkyl aryl sulphonic acid containing 1 to 3 alkyl groups, one of which alkyl groups contains an average number of carbon atoms of at least 40 while any remaining alkyl groups contain less than 10 carbon atoms and
(B) at least one alkyl aryl sulphonic acid containing 1 to 3 alkyl groups, one of which alkyl groups contains an average number of carbon atoms of 10 to 33 while any remaining alkyl groups contain less than 10 carbon atoms.

19. A composition according to claim 16, wherein the metal is magnesium.

20. A composition according to claim 17, wherein the metal is magnesium.

21. A composition according to claim 18, wherein the metal is magnesium.

* * * * *